(12) United States Patent
Xu et al.

(10) Patent No.: US 9,088,990 B2
(45) Date of Patent: Jul. 21, 2015

(54) METHOD FOR PROCESSING SERVICE AND APPARATUS

(71) Applicant: Huawei Technologies Co., LTD, Shenzhen (CN)

(72) Inventors: Xiaoying Xu, Shanghai (CN); Li Feng, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 13/891,901

(22) Filed: May 10, 2013

(65) Prior Publication Data

US 2013/0250759 A1 Sep. 26, 2013

Related U.S. Application Data

(63) Continuation of application No. PCT/CN2011/081461, filed on Oct. 28, 2011.

(30) Foreign Application Priority Data

Nov. 19, 2010 (CN) .......................... 2010 1 0551473

(51) Int. Cl.
*H04W 76/06* (2009.01)
*H04W 76/04* (2009.01)

(52) U.S. Cl.
CPC .......... *H04W 76/064* (2013.01); *H04W 76/068* (2013.01); *H04W 76/045* (2013.01)

(58) Field of Classification Search
None
See application file for complete search history.

(56) References Cited

U.S. PATENT DOCUMENTS

| 2007/0214269 A1 | 9/2007 | Davidsson |
| 2007/0270140 A1 | 11/2007 | Islam et al. |
| 2009/0221277 A1 | 9/2009 | Fomin et al. |
| 2011/0038347 A1* | 2/2011 | Patil et al. ..................... 370/331 |

FOREIGN PATENT DOCUMENTS

| CN | 1853435 A | 10/2006 |
| CN | 101080102 A | 11/2007 |
| EP | 1858209 A1 | 11/2007 |
| WO | 0201903 A1 | 1/2002 |
| WO | 2009061242 A1 | 5/2009 |

OTHER PUBLICATIONS

Chinese Office Action received in Application No. 201010551473.2, mailed Oct. 8, 2013, 6 pages.

(Continued)

*Primary Examiner* — Ashley Shivers
(74) *Attorney, Agent, or Firm* — Slater & Matsil, L.L.P.

(57) ABSTRACT

Embodiments of the present invention disclose a method for processing service and apparatus, relating to the field of communication technologies, and invented for effectively reducing signaling interactions and optimizing the performance of a communication system. The method for processing service includes: receiving a packet data protocol PDP deactivation request message or a signaling connection release indication SCRI message sent from a user equipment; and maintaining a bearer corresponding to the user equipment. The present invention may be used in global systems for mobile communications and long term evolution communication systems.

34 Claims, 8 Drawing Sheets

(56) References Cited

OTHER PUBLICATIONS

Extended European Search Report received in Application No. 11841679.1-1854 mailed Dec. 10, 2013, 9 pages.
Nokia, "Delayed TBF Release," 3GPP TSG GERAN AdHoc #3, Orlando, Florida, Dec. 11-15, 2000, 3 pages.
Ericsson, et al., "Summary of email discussion [67b#16] UMTS: Fast dormancy," 3GPP TSG-RAN WG2#68, R2-096624, Jeju, South Korea, Nov. 9-13, 2009, 7 pages.
3rd Generation Partnership Project; Technical Specification Group Radio Access Network; Radio Resource Control (RRC) Protocol specification (Release 9), 3GPP TS 25.331 V9.4.0, Sep. 2010, 986 pages.
International Search Report received in Application No. PCT/CN2011/081461 mailed Feb. 9, 2012, 3 pages.
Holma, H. et al., "WCDMA for UMTS—HSPA Evolution and LTE," Fifth Edition, 2010 John Wiley & Sons Ltd., 629 pages.
Written Opinion of the International Searching Authority received in Application No. PCT/CN2011/081461 mailed Feb. 9, 2012, 7 pages.

* cited by examiner

METHOD FOR PROCESSING SERVICE AND APPARATUS

CROSS-REFERENCE TO RELATED APPLICATIONS

This application is a continuation of International Application No. PCT/CN2011/081461, filed on Oct. 28, 2011, which claims priority to Chinese Patent Application No. 201010551473.2, filed on Nov. 19, 2010, both of which are hereby incorporated by reference in their entireties.

TECHNICAL FIELD

The present invention relates to the field of communication technologies, and in particular, to a method for processing service and apparatus.

BACKGROUND

With more smart phone handsets, service applications of smart phone handsets become richer. For some packet switched (PS, Packet Switched) services of the service applications of smart phone handsets, to maintain a connection with a network application server, a smart phone sends a heartbeat packet to the network application server. However, different services have different sending frequencies, with the frequency ranging from several seconds to more than ten minutes. After sending the heartbeat packet, if no other service data packets are sent, some smart phone handsets initiate a deactivation process of a packet data protocol (PDP, packet data protocol) or a fast dormancy request process, and the network releases bearers and connections of these smart phone handsets, and the smart phone handsets return to an idle mode or a specific power saving mode. However, after these smart phone handsets enter the idle mode or the specific power-saving mode, when re-initiating services such as a heartbeat packet, the smart phone handsets need to re-initiate a connection setup process and a radio access bearer (RAB, Radio Access Bearer) setup process to the network.

In this way, when the smart phone handsets implement frequent packet services such as heartbeat packets, there are too many air interface signalings and Iu interface signalings and there are too many signaling interactions between the air interfaces and between Iu interfaces, which causes adverse impacts on the performance of the network communication system.

SUMMARY OF THE INVENTION

Multiple aspects of the present invention provide a method for processing service and apparatus to reduce signaling interactions effectively and optimize the performance of a communication system.

One aspect of the present invention provides a method for processing service, including: receiving a packet data protocol PDP deactivation request message sent from a user equipment (UE); and maintaining a bearer corresponding to the UE.

Another aspect of the present invention provides a service processing apparatus, including: a receiving unit, configured to receive a packet data protocol (PDP) deactivation request message or a signaling connection release indication (CSRI, signaling connection release indication) message sent from a user equipment; and a processing unit, configured to maintain a bearer corresponding to the user equipment.

After the foregoing technical solutions are used, the method for processing service and apparatus provided in embodiments of the present invention can effectively prevent the UE from initiating a connection setup process and a radio access bearer setup process to the network frequently and repeatedly. Therefore, signaling interactions between the UE and a network entity and between network layer entities are effectively reduced, thereby optimizing the performance of a communication system.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following descriptions show merely some embodiments of the present invention, and persons of ordinary skill in the art may still derive other drawings from the accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments determined by persons of ordinary skill in the art based on the embodiments of the present invention without creative efforts shall fall within the protection scope of the present invention.

Embodiments of the present invention provide a method for processing service and apparatus to reduce signaling interactions effectively and optimize the performance of a communication system.

In addition, terms "system" and "network" in the specification can often be used interchangeably. In the specification, the term "and/or" merely describes an association relationship between associating objects, indicating that three types of relationships may exist. For example, A and/or B may indicate the following three cases: A exists independently, A and B exist at the same time, and B exists independently. In addition, the character "/" in the specification generally indicates an "or" relationship between associating objects.

One aspect of the present invention discloses a method for processing service. The method includes: receiving a packet data protocol PDP deactivation request message or a signaling connection release indication SCRI message sent from a UE; and maintaining a bearer corresponding to the UE.

The method may be implemented by different network entities, for example, a core network entity or an access network entity. The core network entity receives a PDP deactivation request message sent from the UE, for example, an SGSN of a core network, and the access network entity receives a signaling connection release indication SCRI message sent from the user equipment, for example, an RNC of an access network.

In another embodiment of the present invention, the maintaining a bearer corresponding to the UE includes: maintaining a bearer corresponding to the UE in a specific maintaining duration; and when the specific maintaining duration expires, releasing the bearer corresponding to the UE.

The bearer corresponding to the UE includes an RAB or an Iu connection. In an embodiment of the present invention, when the Iu connection corresponding to the user equipment is maintained, the method of the present invention further includes: releasing the RAB corresponding to the UE.

Figure 1:
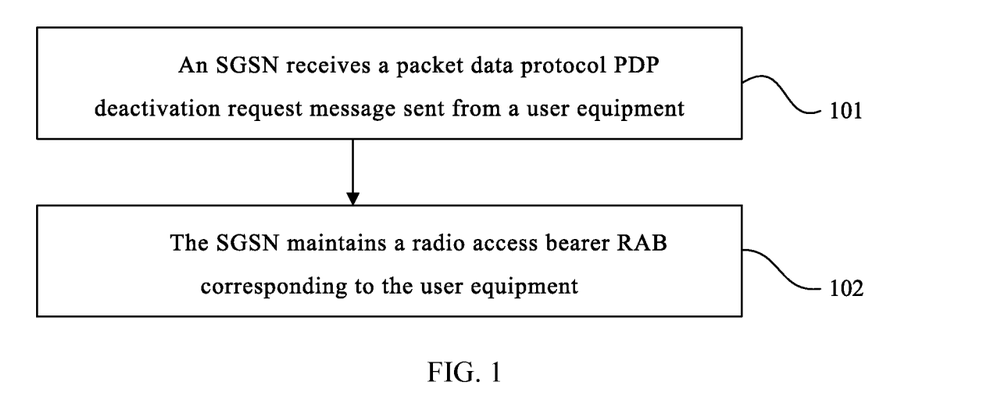
FIG. 1 is a flowchart of a method for processing service according to an embodiment of the present invention.

As shown in FIG. 1, a method for processing service according to an embodiment of the present invention is illustrated. This embodiment is based on a core network entity SGSN (serving GPRS support node, serving GPRS support Node), which may be described as follows.

101. An SGSN receives a packet data protocol PDP deactivation request message sent from a user equipment.

102. The SGSN maintains a radio access bearer RAB corresponding to the UE.

In this way, when the UE re-initiates a service, the SGSN does not need to re-initiate an RAB assignment process and a security mode command (SMC, security mode command) process, but can re-initiate a service by using the maintained RAB. Therefore, signaling interactions between the UE and a network entity and between network layer entities are effectively reduced, thereby optimizing the performance of a communication system.

In 102, the SGSN may maintain the RAB corresponding to the UE permanently. To further effectively improve the performance of the communication system, preferentially, the SGSN maintains the RAB corresponding to the UE in a specific maintaining duration; when the specific maintaining duration expires, the SGSN releases the RAB corresponding to the UE. The specific maintaining duration may be set by the SGSN according to an empirical value or may be set manually, or may be set according to performance requirements of a core network and between the core network and an access network, which is not specifically limited in this embodiment. For example, a timer for detecting data transmission of the UE may be set in the SGSN, and a timing duration of the timer is the specific maintaining duration. When the timer expires, the SGSN releases the RAB corresponding to the UE.

In another embodiment of the present invention, the method for processing service may further include: sending, by an SGSN, a bearer instruction message to an access network, where the bearer instruction message includes instruction information used to instruct the access network to maintain an RAB corresponding to a UE, so that an access network entity can maintain the RAB corresponding to the UE.

For example, the SGSN may send a bearer instruction message to the access network after 101 and before 102, which is not limited herein. For example, when the SGSN receives a PDP activation message or a PDP deactivation request message sent from the UE, the SGSN sends a bearer instruction message to the access network. For another example, when determining that the UE uses a frequent packet service such as a heartbeat packet, the SGSN sends a bearer instruction message to the access network. For another example, when determining that signaling overload occurs on a core network, the SGSN sends a bearer instruction message to the access network. For another example, when determining that the UE is a smart phone UE, the SGSN sends a bearer instruction message to the access network. The SGSN may send the foregoing bearer instruction message to other network entities by using a dedicated radio access network application art RANAP (radio access network application part) message or a public RANAP message.

The bearer instruction message may further include a reference maintaining duration where the access network maintains the RAB, so that the access network can determine, according to the reference maintaining duration, a specific maintaining duration where the access network maintains the RAB corresponding to the UE.

It should be noted that the bearer instruction message may be determined by an access network entity and sent by the access network entity to the SGSN. Therefore, before 101, the method for processing service according to the embodiment of the present invention may further include: receiving, by the SGSN, a bearer instruction message sent from an access network, where the bearer instruction message includes instruction information used to instruct a core network to maintain an RAB corresponding to the UE.

In this case, in 102, the SGSN maintains the RAB corresponding to the UE according to the instruction of the received bearer instruction message.

In addition, the bearer instruction message received by the SGSN may further include a reference maintaining duration where the core network maintains the RAB; the SGSN can determine, according to the reference maintaining duration, a specific maintaining duration where the core network maintains an RAB corresponding to the UE. In this case, in 102, the SGSN maintains the RAB corresponding to the UE in the specific maintaining duration determined according to the reference maintaining duration; and when the specific maintaining duration expires, the SGSN releases the RAB corresponding to the UE.

Figure 2:
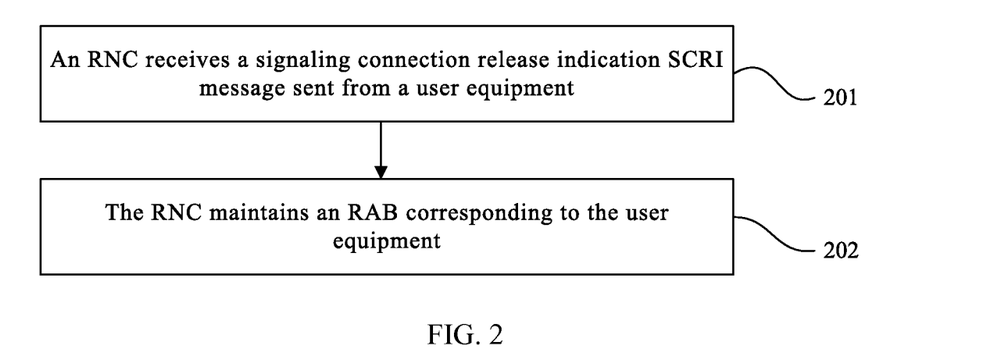
FIG. 2 is another flowchart of a method for processing service according to another embodiment of the present invention.

As shown in FIG. 2, a method for processing service according to an embodiment of the present invention is illustrated. This embodiment is based on an access network entity RNC, which may be described as follows.

201. An RNC receives a signaling connection release indication SCRI message sent from a user equipment.

202. The RNC maintains an RAB corresponding to the user equipment.

In this way, when the UE re-initiates a service, an RAB assignment process and an SMC process do not need to be re-initiated, but the transmission of the service can be re-initiated by using the maintained RAB directly. Therefore, signaling interactions between the UE and a network entity and between network layer entities are effectively reduced, thereby optimizing the performance of a communication system.

For example, in 202, the RNC controls the user equipment to enter a power-saving connection state and maintains an RAB corresponding to the user equipment in the power-saving connection state in a specific maintaining duration; and when the specific maintaining duration expires, the RNC releases the RAB corresponding to the user equipment. The specific maintaining duration may be set by the RNC according to an empirical value or may be set manually, or may be set by the RNC according to performance requirements of an access network and between the access network and a core network, which is not specifically limited in this embodiment. For example, a timer for detecting data transmission of the UE may be set in the RNC, and a timing duration of the timer is the specific maintaining duration; and when the timer expires, the RNC releases the RAB corresponding to the UE. The power-saving connection state includes a cell_paging channel (CELL_PCH) state or a cell_forward access channel (CELL_FACH) state.

Further, before 201, the method for processing service according to this embodiment may further include: receiving, by the RNC, a bearer instruction message sent from a core network, where the bearer instruction message includes instruction information used to instruct an access network to maintain an RAB corresponding to the user equipment.

In this case, in 202, the RNC maintains the RAB corresponding to the UE according to the instruction of the received bearer instruction message.

In addition, the bearer instruction message received by the RNC may further include a reference maintaining duration where the access network maintains the RAB; the RNC can determine, according to the reference maintaining duration, a specific maintaining duration where the access network maintains the RAB corresponding to the user equipment. In this case, in 202, the RNC maintains the RAB corresponding to the user equipment in the specific maintaining duration determined according to the reference maintaining duration. For example, the RNC may select a larger value between the reference maintaining duration and a maintaining duration, which is stored on the access network, as a specific maintaining duration where the access network maintains the RAB corresponding to the user equipment. When the specific maintaining duration expires, the RNC releases the RAB corresponding to the user equipment.

It should be noted that when the RNC is capable of determining a bearer instruction message, the RNC may also determine a bearer instruction message actively and send the bearer instruction message to the core network. Therefore, the method for processing service according to this embodiment may further include: sending, by the RNC, a bearer instruction message to a core network, where the bearer instruction message includes instruction information used to instruct the core network to maintain the RAB corresponding to the UE.

The bearer instruction message may further include a reference maintaining duration where the core network maintains the RAB, so that the core network can determine, according to the reference maintaining duration, a specific maintaining duration where the core network maintains the RAB corresponding to the user equipment.

Figure 3:
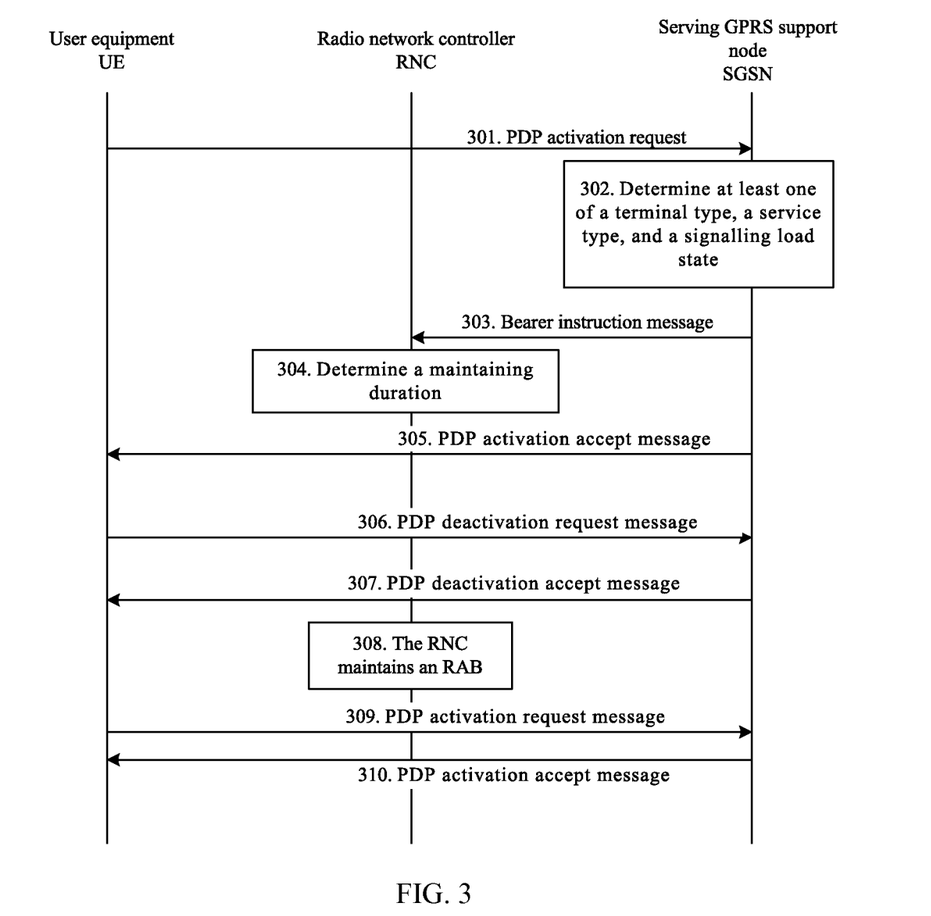
FIG. 3 is another flowchart of a method for processing service according to another embodiment of the present invention.

The following specifically describes a method for processing service according to an embodiment of the present invention based on an application scenario of PDP deactivation. As shown in FIG. 3, this embodiment may be described as follows.

301. An SGSN receives a PDP activation request message sent from a user equipment.

302. The SGSN detects at least one of a terminal type of the UE, a service type of the UE, and a signaling load state of a core network.

In this step, the SGSN optionally detects the terminal type of the UE, and/or whether a PS service type of the UE is a frequent packet service, for example, a heartbeat packet service, and/or the signaling load state of the core network.

For the terminal type of the UE, whether the UE is a smart phone according to a field in the international mobile equipment identity (IMEI) may be determined or the terminal type of the UE may be determined by interactions with other network entities.

The service type of the UE may be determined after the core network parses a data packet, or may be determined by the interaction with a policy and charging rule function (PCRF), or may be determined by a report from the UE.

303. When determining that the UE is a smart phone and/or the PS service type is a frequent packet service and/or signaling overload occurs on the core network, the SGSN delivers a bearer instruction message to an RNC corresponding to the UE by using an RANAP message.

For example, the bearer instruction message includes an instruction message used to instruct the RNC to maintain an RAB. In another embodiment of the present invention, the bearer instruction message may further include a reference maintaining duration where the RNC maintains the RAB corresponding to the UE, where the reference maintaining duration is suggested by the SGSN for the RNC; and may further include information such as a reason of maintaining the RAB.

304. The RNC receives the bearer instruction message sent from the SGSN, and learns that the RNC needs to maintain the UE in a connected state and maintain the RAB. In addition, the RNC determines, according to the bearer instruction message, a maintaining duration where the RNC maintains the RAB corresponding to the UE.

For example, the RNC may select a larger value between the reference maintaining duration in the bearer instruction message and a maintaining duration set or stored on the RNC, and sets the larger value as a maintaining duration where the RNC maintains the RAB corresponding to the UE. When the bearer instruction message does not include a specific maintaining duration, the RNC may set a specific maintaining duration according to an empirical value or a largest value of a currently known sending period of a heartbeat packet service. When the maintaining duration of the RNC expires, the RNC releases the RAB corresponding to the UE. Preferentially, the maintaining duration of the RNC should be smaller than the specific maintaining duration of the SGSN, that is, the SGSN has a specific delay relative to the RNC to ensure that the SGSN does not trigger an RAB release process before the RNC does.

305. The SGSN sends a PDP activation accept message to the UE.

306. The SGSN receives a PDP deactivation request message sent from the UE.

307. The SGSN does not initiate a PDP context release process and an RAB release process. That is, the SGSN maintains the RAB and PDP context corresponding to the UE, and sends a deactivation accept message to the UE.

308. After determining that the UE has no data transmission within a period of time, the RNC switches the UE to a CELL_PCH state or a CELL_FACH state. For the UE in the CELL_PCH state or the CELL_FACH state, the RNC maintains the RAB corresponding to the UE in a specific maintaining duration; and when the specific maintaining duration expires, the RNC releases the RAB corresponding to the UE.

309. The UE re-initiates a PS service, and sends a service request (Service Request) and a PDP activation request to the SGSN.

310. The SGSN sends a PDP activation accept message to the UE, so that the UE can continue to transmit a service by using the RAB and the PDP context.

When the UE needs to re-send a service such as a heartbeat service, the SGSN does not need to initiate an RAB assignment process and an SMC process, but needs to send a PDP activation accept message to the UE, and the RNC optionally re-assigns an RAB to the UE. Therefore, signaling interactions are effectively reduced, and the performance of a system is optimized.

For example, the SGSN can detect the quality of service QoS of an activated PDP; if the QoS of the activated PDP remains unchanged, the SGSN does not need to initiate an RAB assignment process and an SMC process, but only needs to send a PDP activation accept message to the UE to transmit a PS service such as heartbeat data. If the QoS is changed, the SGSN needs to implement an RAB assignment process to modify a bearer.

Figure 4:
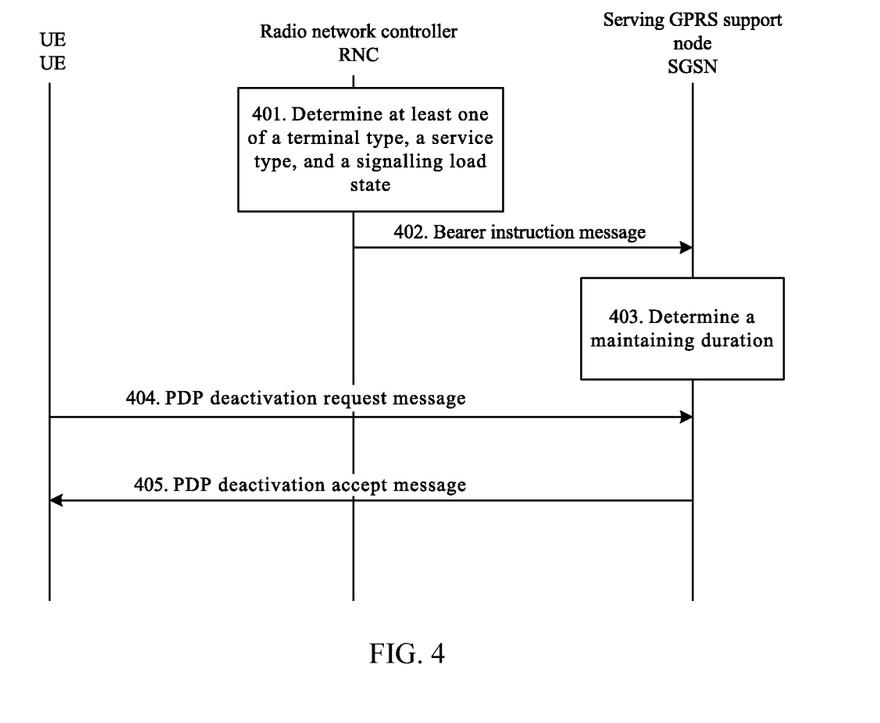
FIG. 4 is another flowchart of a method for processing service according to another embodiment of the present invention.

The following specifically describes a method for processing service according to an embodiment of the present invention based on an application scenario of PDP deactivation. As shown in FIG. 4, this embodiment may be described as follows.

401. An RNC detects at least one of a terminal type of a UE, a service type of the UE, and a signaling load state of a core network.

402. When determining that the UE is a smart phone and/or a PS service type is a frequent packet service and/or signaling overload occurs on the core network, the RNC delivers a bearer instruction message to a core network entity SGSN by using an RANAP message.

For example, the bearer instruction message includes information used to instruct the SGSN to maintain an RAB of the UE or an RAB and a PDP context of the UE when the SGSN receives a PDP deactivation request, or instruct the SGSN not to actively initiate RAB release when the SGSN detects that the UE has not data transmission. The bearer instruction message may further include a reference maintaining duration where the SGSN maintains an RAB corresponding to the UE and may further include information such as a reason of maintaining the RAB.

403. The SGSN receives a bearer instruction message sent from the RNC, and determines a maintaining duration where the SGSN maintains the RAB of the UE.

For example, the SGSN configures, according to the instruction in the bearer instruction message, a maintaining duration where the SGSN maintains the RAB. Preferentially, the maintaining duration of the SGSN should be greater than a specific maintaining duration of the RNC, that is, the SGSN has a specific delay relative to the RCN.

404. The SGSN receives a PDP deactivation message sent from the UE.

405. The SGSN does not initiate a process of releasing the RAB and PDP context, that is, it maintains the RAB and the PDP context corresponding to the UE, and sends a deactivation accept message to the UE. The SGSN does not initiate RAB release in a specific maintaining duration. The specific maintaining duration may be an infinite value.

Figure 5:
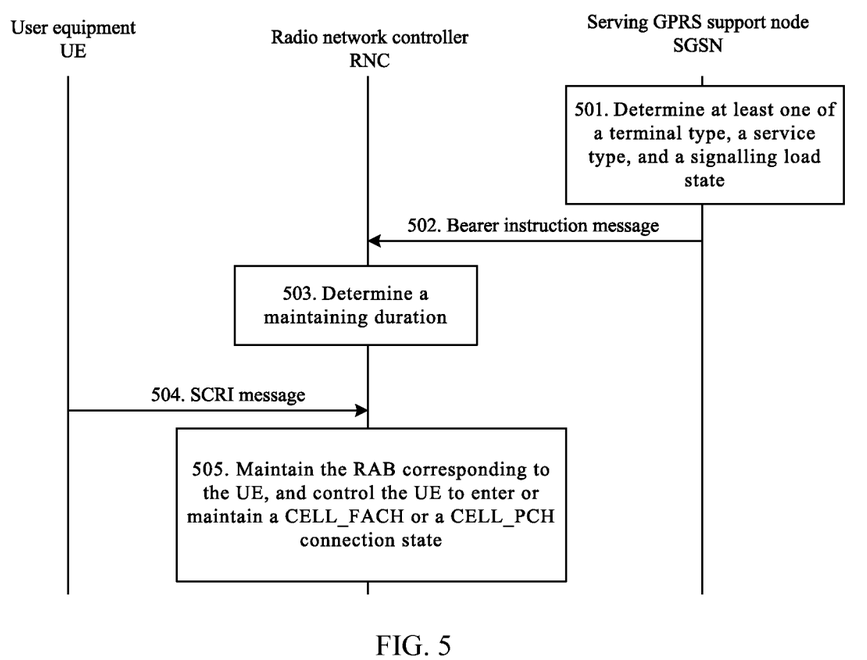
FIG. 5 is another flowchart of a method for processing service according to another embodiment of the present invention.

The following specifically describes a method for processing service according to an embodiment of the present invention based on an application scenario of fast dormancy. As shown in FIG. 5, this embodiment may be described as follows.

501. An SGSN detects at least one of a terminal type of a UE, a service type of the UE, and a signaling load state of a core network.

502. When determining that the UE is a smart phone and/or a PS service type is a frequent packet service and/or signaling overload occurs on the core network, the SGSN delivers a bearer instruction message to an RNC corresponding to the UE by using an RANAP message.

For example, the bearer instruction message includes an instruction message used to instruct the RNC to maintain an RAB; may further include a reference maintaining duration where the RNC maintains the RAB corresponding to the UE, where the reference maintaining duration is configured by the SGSN for the RNC; and may further include information such as a reason of maintaining the RAB.

503. The RNC receives the bearer instruction message sent from the SGSN, and learns that the RNC needs to maintain the UE in a connected state and maintain the RAB. In addition, the RNC determines, according to the bearer instruction message, a specific maintaining duration where the RNC maintains the RAB of the UE.

504. The RNC receives an SCRI message sent from the UE for a fast dormancy indication.

505. The RNC controls the UE to enter or maintain a CELL_PCH connection state or a CELL_FACH connection state. For the UE in the CELL_PCH connection state or the CELL_FACH connection state, the RNC does not initiate an RAB release process in a specific maintaining duration of the RNC, that is, it maintains the RAB corresponding to the UE.

Figure 6:
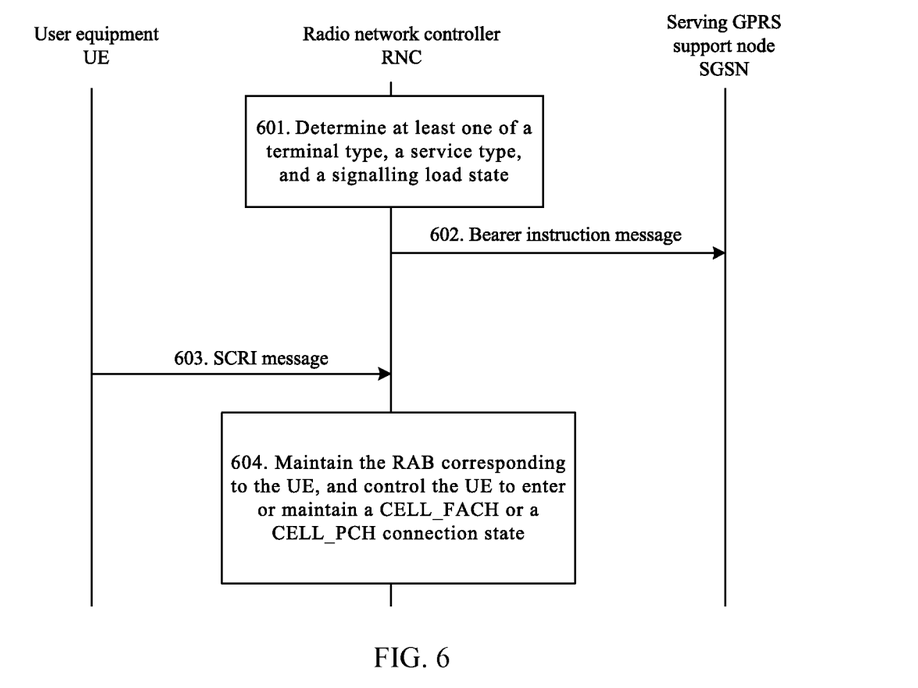
FIG. 6 is another flowchart of a method for processing service according to another embodiment of the present invention.

The following specifically describes a method for processing service according to an embodiment of the present invention based on an application scenario of fast dormancy. As shown in FIG. 6, this embodiment may be described as follows.

601. An RNC detects at least one of a terminal type of a UE, a service type of the UE, and a signaling load state of a core network.

602. When determining that the UE is a smart phone and/or a PS service type is a frequent packet service and/or signaling overload occurs on the core network, the RNC delivers a bearer instruction message to a core network entity SGSN by using an RANAP message.

603. The RNC receives an SCRI message sent from the UE for a fast dormancy indication.

604. The RNC controls the UE to enter or maintain a CELL_PCH connection state or a CELL_FACH connection state. For the UE in the CELL_PCH connection state or the CELL_FACH connection state, the RNC does not initiate an RAB release process in a specific maintaining duration of the RNC, that is, it maintains the RAB corresponding to the UE.

Figure 7:
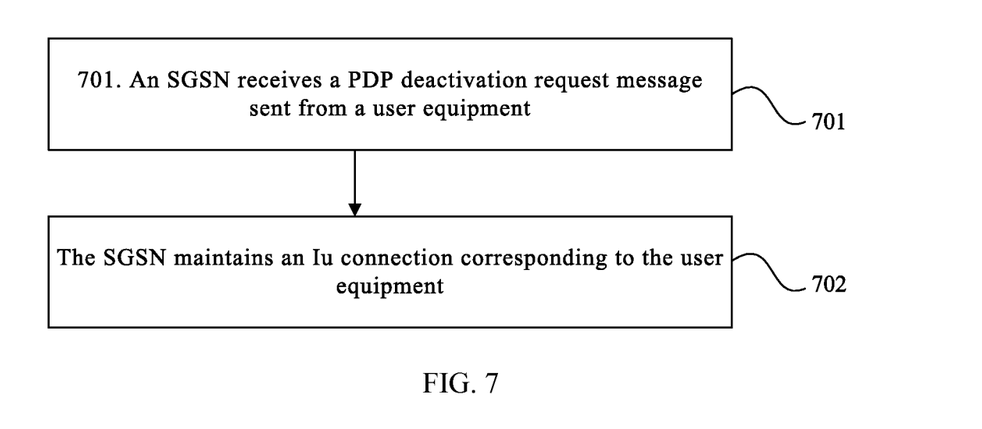
FIG. 7 is another flowchart of a method for processing service according to another embodiment of the present invention.

The following specifically describes a method for processing service according to an embodiment of the present invention based on an application scenario of PDP deactivation. As shown in FIG. 7, this embodiment may be described as follows.

701. An SGSN receives a PDP deactivation request message sent from a user equipment.

702. The SGSN maintains an Iu connection corresponding to the UE.

By using the method for processing service provided in the embodiment of the present invention, signaling interactions between a UE and a network entity and between network layer entities are effectively reduced, thereby optimizing the performance of a communication system.

Figure 8:
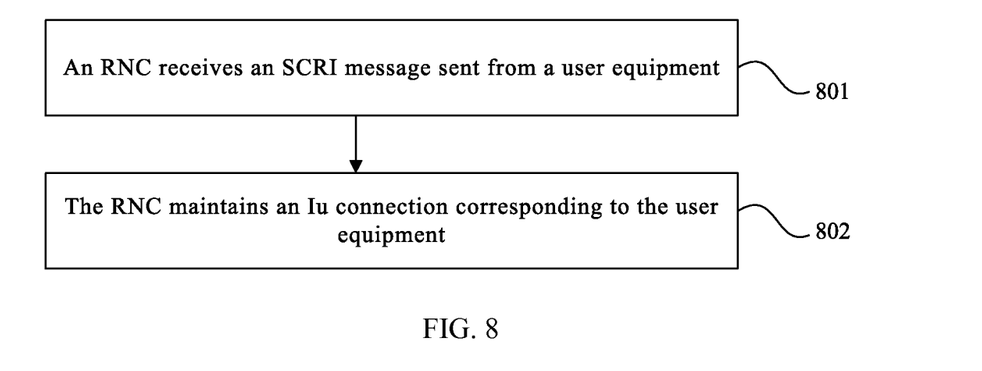
FIG. 8 is another flowchart of a method for processing service according to another embodiment of the present invention.

The following specifically describes a method for processing service according to an embodiment of the present invention based on an application scenario of fast dormancy. As shown in FIG. 8, this embodiment may be described as follows.

801. An RNC receives an SCRI message sent from a user equipment.

802. The RNC maintains an Iu connection corresponding to the UE.

By using the method for processing service provided in the embodiment of the present invention, signaling interactions between a UE and a network entity and between network layer entities are effectively reduced, thereby optimizing the performance of a communication system.

It should be noted that the difference between the method for processing services illustrated in FIG. 7 and FIG. 8 and the method for processing services in the foregoing embodiments lies in that: In the foregoing embodiments, during the processing, the SGSN or the RNC maintains the RAB corresponding to the UE; in the method for processing services illustrated in FIG. 7 and FIG. 8, the SGSN or the RNC may release the RAB corresponding to the UE, but maintains the Iu connection corresponding to the UE. The method for processing services illustrated in FIG. 7 and FIG. 8 are similar to those in the foregoing embodiments in terms of other processes. For details, reference may be made to the foregoing description, and details are not repeated herein.

Another aspect of the present invention corresponds to the foregoing method for processing service and discloses a service processing apparatus, including a receiving unit and a processing unit.

The receiving unit is configured to receive a packet data protocol PDP deactivation request message or a signaling connection release indication SCRI message sent from a user equipment.

The processing unit is configured to maintain a bearer corresponding to the UE.

The bearer corresponding to the UE includes an RAB or an Iu connection. In an embodiment of the present invention, the processing unit further includes a first processing unit or a second processing unit.

The first processing unit is configured to maintain an RAB corresponding to the user equipment.

The second processing unit is configured to maintain an Iu connection corresponding to the user equipment.

Further, the second processing unit is further configured to release a radio access bearer RAB corresponding to the user equipment.

By using the service processing apparatus provided in the embodiment of the present invention, signaling interactions between a UE and a network entity and between network layer entities are effectively reduced, thereby optimizing the performance of a communication system.

The following specifically describes a service processing apparatus provided in an embodiment of the present invention.

Figure 9:
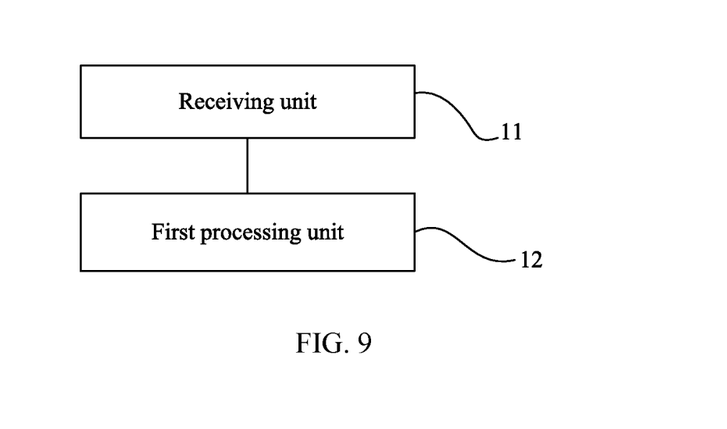
FIG. 9 is a structural block diagram of an SGSN according to another embodiment of the present invention.

An embodiment of the present invention provides an SGSN. As shown in FIG. 9, the SGSN includes a receiving unit 11 and a first processing unit 12.

The receiving unit 11 is configured to receive a packet data protocol PDP deactivation request message sent from a user equipment.

The first processing unit 12 is configured to maintain an RAB corresponding to the user equipment.

By using the SGSN provided in the embodiment of the present invention, signaling interactions between a UE and a network entity and between network layer entities are effectively reduced, thereby optimizing the performance of a communication system.

The first processing unit 12 is specifically configured to maintain the RAB corresponding to the user equipment in a specific maintaining duration, and release the RAB corresponding to the user equipment when the specific maintaining duration expires.

Figure 10:
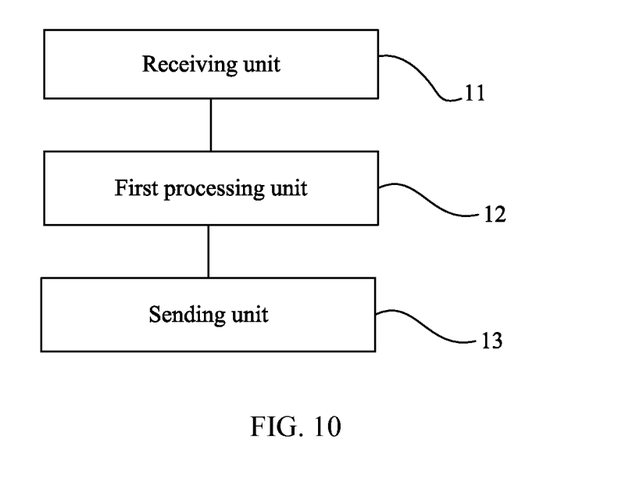
FIG. 10 is another structural block diagram of the SGSN illustrated in FIG. 9.

Further, in an embodiment of the present invention, as shown in FIG. 10, the SGSN may further include a sending unit 13.

The sending unit 13 is configured to send a bearer instruction message to an access network, where the bearer instruction message includes instruction information used to instruct the access network to maintain the RAB corresponding to the user equipment. The bearer instruction message may further include a reference maintaining duration where the access network maintains the RAB, so that the access network can determine, according to the reference maintaining duration, a specific maintaining duration where the access network maintains the RAB corresponding to the user equipment.

Further, in another embodiment of the present invention, the receiving unit 11 may be further configured to receive a bearer instruction message sent from an access network, where the bearer instruction message includes instruction information used to instruct a core network to maintain an RAB corresponding to the user equipment. In this case, the first processing unit 12 is specifically configured to maintain the RAB corresponding to the user equipment according to the instruction of the bearer instruction message.

In addition, the bearer instruction message received by the receiving unit 11 may further include a reference maintaining duration where the core network maintains the RAB. In this case, the first processing unit 12 is specifically configured to determine, according to the reference maintaining duration, a specific maintaining duration where the core network maintains the RAB corresponding to the user equipment, maintain the RAB corresponding to the user equipment during the specific maintaining duration, and release the RAB corresponding to the user equipment when the specific maintaining duration expires.

Figure 11:
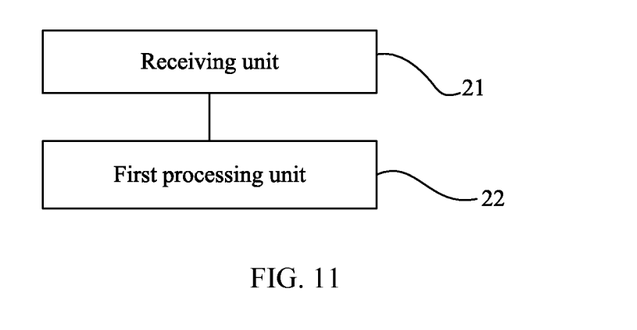
FIG. 11 is a structural block diagram of an RNC according to another embodiment of the present invention.

As shown in FIG. 11, an embodiment of the present invention provides an RNC. The RNC includes a receiving unit 21 and a first processing unit 22.

The receiving unit 21 is configured to receive a signaling connection release indication SCRI message sent from a user equipment.

The first processing unit 22 is configured to maintain an RAB corresponding to the user equipment.

By using the RNC provided in the embodiment of the present invention, signaling interactions between a UE and a network entity and between network layer entities are effectively reduced, thereby optimizing the performance of a communication system.

The first processing unit 22 is specifically configured to control the user equipment to enter a power-saving connection state, maintain an RAB corresponding to the user equipment in the power-saving connection state in a specific maintaining duration, and release the RAB corresponding to the user equipment when the specific maintaining duration expires.

Further, in an embodiment of the present invention, the receiving unit 21 is further configured to receive a bearer instruction message sent from a core network, where the bearer instruction message includes instruction information used to instruct an access network to maintain the RAB corresponding to the user equipment.

In this case, the first processing unit 22 is specifically configured to maintain the RAB corresponding to the user equipment according to the instruction of the bearer instruction information.

In addition, the bearer instruction message further includes a reference maintaining duration where the access network maintains the RAB. In this case, the first processing unit 22 of the processing unit is specifically configured to determine, according to the reference maintaining duration, a specific maintaining duration where the access network maintains the RAB corresponding to the user equipment. For example, the first processing unit 22 of the processing unit selects a larger value between the reference maintaining duration and a maintaining duration, which is stored on the access network, as a specific maintaining duration where the access network maintains the RAB corresponding to the user equipment. The first processing unit 22 of the processing unit is specifically configured to maintain the RAB corresponding to the user equipment in the specific maintaining duration, and release the RAB corresponding to the user equipment when the specific maintaining duration expires.

Figure 12:
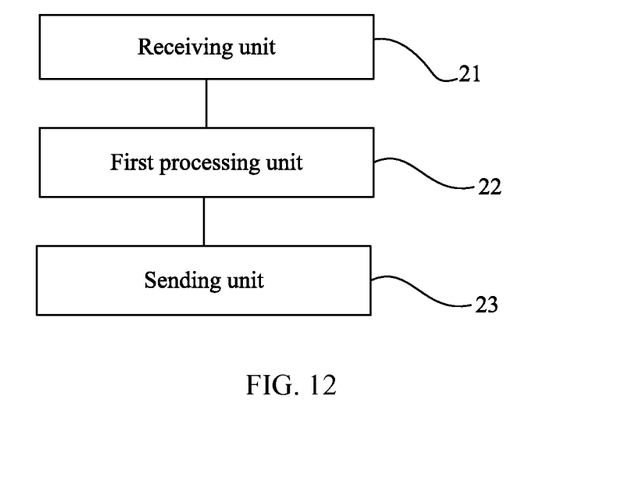
FIG. 12 is another structural block diagram of the RNC illustrated in FIG. 11.

Further, in an embodiment of the present invention, as shown in FIG. 12, the RNC may further include a sending unit 23.

The sending unit 23 is configured to send a bearer instruction message to a core network, where the bearer instruction message includes instruction information used to instruct the core network to maintain an RAB corresponding to the user equipment. The bearer instruction message may further include a reference maintaining duration where the core network maintains the RAB, so that the core network can determine, according to the reference maintaining duration, a specific maintaining duration where the core network maintains the RAB corresponding to the user equipment.

Figure 13:
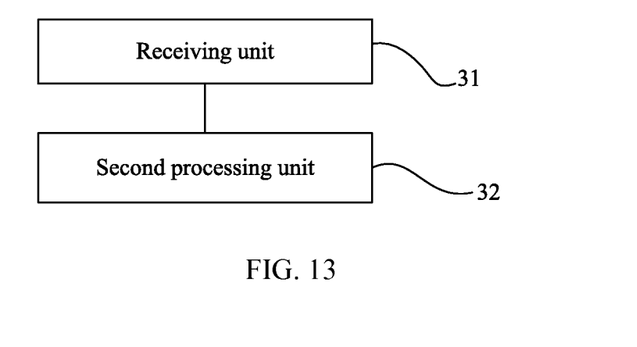
FIG. 13 is another structural block diagram of an SGSN according to another embodiment of the present invention.

An embodiment of the present invention provides an SGSN. As shown in FIG. 13, the SGSN includes a receiving unit 31 and a second processing unit 32.

The receiving unit 31 is configured to receive a packet data protocol PDP deactivation request message sent from a user equipment.

The second processing unit 32 is configured to maintain an Iu connection corresponding to the user equipment.

The second processing unit 32 is further configured to release a radio access bearer RAB corresponding to the user equipment.

By using the SGSN provided in the embodiment of the present invention, signaling interactions between a UE and a network entity and between network layer entities are effectively reduced, thereby optimizing the performance of a communication system.

Figure 14:
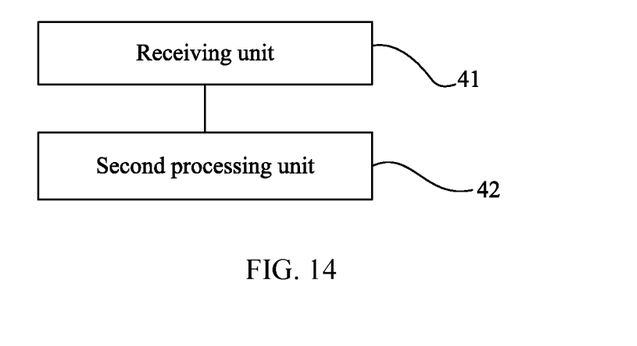
FIG. 14 is another structural block diagram of an RNC according to another embodiment of the present invention.

An embodiment of the present invention provides an RNC. As shown in FIG. 14, the RNC includes a receiving unit 41 and a second processing unit 42.

The receiving unit 41 is configured to receive a signaling connection release indication SCRI message sent from a user equipment.

The second processing unit 42 is configured to maintain an Iu connection corresponding to the user equipment.

The second processing unit 32 is further configured to release the radio access bearer RAB corresponding to the user equipment.

By using the RNC provided in the embodiment of the present invention, signaling interactions between a UE and a network entity and between network layer entities are effectively reduced, thereby optimizing the performance of a communication system.

It should be noted that the difference between the service processing apparatuses illustrated in FIG. 13 and FIG. 14 are different from the service processing apparatuses in the foregoing embodiments lies in that: In the foregoing embodiments, during the processing, the SGSN or the RNC maintains the RAB corresponding to the UE; in the service processing apparatuses illustrated in FIG. 13 and FIG. 14, the SGSN or the RNC may release the RAB corresponding to the UE, but maintains the Iu connection corresponding to the UE. The service processing apparatuses illustrated in FIG. 13 and FIG. 14 are similar to those in the foregoing embodiments in terms of other structures and functions. For details, reference may be made to the foregoing description, and the details are not repeated herein.

It can be clearly understood by persons skilled in the art that, for the purpose of convenient and brief description, division of the foregoing function modules is taken as an example for description, in actual implementation, the foregoing functions can be allocated to different modules and implemented according to the needs, that is, the inner structure of the apparatus is divided into different function modules to implement all or part of the foregoing functions. For a detailed working process of the foregoing system, apparatus and unit, reference may be made to the corresponding process in the method embodiments, and the details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

When the integrated unit are implemented in the form of a software functional unit and sold or used as an independent product, the integrated unit may be stored in a computer-readable storage medium. Based on such an understanding, the technical solution of the present invention essentially, or the part contributing to the prior art may be implemented in the form of a software product. The computer software product is stored in a storage medium, and includes several instructions for instructing a computer device (which may be a personal computer, a server, or a network device) to perform all or part of the steps of the methods provided in the embodiments of the present invention. The storage medium includes:

any medium that can store program codes, such as a USB flash disk, a removable hard disk, a read-only memory (ROM, Read-Only Memory), a random access memory (RAM, Random Access Memory), a magnetic disk, or an optical disk.

The foregoing description is merely about specific embodiments of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for processing service, the method comprising:
    receiving, by a core network component, a packet data protocol (PDP) deactivation request message from a user equipment; and
    sending, by the core network, a bearer instruction message to an access network to maintain a bearer corresponding to the user equipment, wherein the bearer instruction message comprises instruction information used to instruct the access network to maintain the bearer corresponding to the user equipment.

2. The method according to claim 1, wherein the instruction information instructs the access network to maintain the bearer for a specific maintaining duration, and to release the bearer when the specific maintaining duration expires.

3. The method according to claim 1, wherein the bearer instruction message further comprises a reference maintaining duration where the access network maintains the bearer, so that the access network determines, according to the reference maintaining duration, a specific maintaining duration where the access network maintains the bearer corresponding to the user equipment.

4. The method according to claim 1, wherein sending the bearer instruction message to the access network comprises:
    detecting, by the core network, a terminal type of the user equipment; and
    sending, by the core network, the bearer instruction message to the access network when determining that the user equipment is a smart phone.

5. The method according to claim 1, wherein the bearer corresponding to the user equipment comprises one of a radio access bearer (RAB) and an Iu connection.

6. The method according to claim 5, wherein maintaining the bearer comprises maintaining the Iu connection corresponding to the user equipment, and wherein the method further comprises:
    releasing the radio access bearer (RAB) corresponding to the user equipment.

7. The method according to claim 1, wherein sending the bearer instruction message to the access network comprises:
    detecting, by the core network, a service type of the user equipment; and
    sending, by the core network, the bearer instruction message to the access network when determining that the user equipment implements a frequent packet service.

8. The method according to claim 1, wherein sending the bearer instruction message to the access network comprises:
    detecting, by the core network, a signaling load state of the core network; and
    sending, by the core network, the bearer instruction message to the access network when determining a signaling overload occurs on the core network.

9. A method for processing service, the method comprising:
    receiving, by a core network, a bearer instruction message sent from an access network prior to communication of a packet data protocol (PDP) deactivation request message or a signaling connection release indication (SCRI) message by a user equipment, wherein the bearer instruction message comprises instruction information used to instruct the core network to maintain the bearer corresponding to the user equipment; and
    maintaining, by the core network, the bearer corresponding to the user equipment according to the bearer instruction message.

10. The method according to claim 9, wherein the bearer instruction message further comprises a reference maintaining duration where the core network maintains the bearer,
    wherein after receiving the bearer instruction message sent from the access network, the method further comprises determining, by the core network, according to the reference maintaining duration, a specific maintaining duration where the core network maintains the bearer corresponding to the user equipment, and
    wherein maintaining the bearer corresponding to the user equipment comprises maintaining, by the core network, the bearer corresponding to the user equipment in the specific maintaining duration; and releasing the bearer corresponding to the user equipment when the specific maintaining duration expires.

11. A method for processing service, the method comprising:
    receiving, by an access network, a bearer instruction message from a core network prior to communication of a packet data protocol (PDP) deactivation request message or a signaling connection release indication (SCRI) message by a user equipment, wherein the bearer instruction message comprises instruction information used to instruct the access network to maintain the bearer corresponding to the user equipment; and
    maintaining, by the access network, the bearer corresponding to the user equipment according to the bearer instruction message.

12. The method according to claim 11, wherein the bearer instruction message further comprises a reference maintaining duration where the access network maintains the bearer,
    wherein after receiving the bearer instruction message sent from the core network, the method further comprises determining, by the access network, according to the reference maintaining duration, a specific maintaining duration where the access network maintains the bearer corresponding to the user equipment, and
    wherein maintaining the bearer corresponding to the user equipment comprises maintaining, by the access network, the bearer corresponding to the user equipment in the specific maintaining duration; and releasing the bearer corresponding to the user equipment when the specific maintaining duration expires.

13. The method according to claim 12, wherein determining the specific maintaining duration where the access network maintains the bearer corresponding to the user equipment comprises:
    selecting, by the access network, a larger value between the reference maintaining duration and a stored maintaining duration as the specific maintaining duration where the access network maintains the bearer corresponding to the user equipment, wherein the stored maintaining duration is stored in the access network.

14. A method for processing service, the method comprising:

receiving, by an access network, a signaling connection release indication (SCRI) message sent from a user equipment; and sending, by the access network, a bearer instruction message to a core network, wherein the bearer instruction message comprises instruction information used to instruct the core network to maintain the bearer corresponding to the user equipment.

15. The method according to claim 14, wherein the bearer instruction message further comprises a reference maintaining duration where the core network maintains the bearer, so that the core network determines, according to the reference maintaining duration, a specific maintaining duration where the core network maintains the bearer corresponding to the user equipment.

16. The method according to claim 14, wherein sending the bearer instruction message to the core network comprises:
determining, by the access network, a terminal type of the user equipment; and
sending, by the access network, the bearer instruction message to the core network when determining that the user equipment is a smart phone.

17. The method according to claim 14, wherein sending the bearer instruction message to the core network comprises:
detecting, by the access network, a service type of the user equipment; and
sending, by the access network, the bearer instruction message to the access network when determining that the user equipment implements a frequent packet service.

18. The method according to claim 14, wherein sending the bearer instruction message to the core network comprises:
detecting, by the access network, a signaling load state of the core network; and
sending, by the access network, the bearer instruction message to the access network when determining a signaling overload occurs on the core network.

19. A service processing apparatus comprising:
a receiver configured to receive a packet data protocol (PDP) deactivation request message from a user equipment; and
a transmitter configured to send a bearer instruction message to an access network to maintain a bearer corresponding to the user equipment, wherein the bearer instruction message comprises instruction information used to instruct the access network to maintain the bearer corresponding to the user equipment.

20. The apparatus according to claim 19, wherein the instruction information includes instructions to maintain the bearer corresponding to the user equipment in a specific maintaining duration, and to release the bearer corresponding to the user equipment when the specific maintaining duration expires.

21. The apparatus according to claim 19, further comprising:
a processor configured to detect a terminal type of the user equipment, wherein the transmitter is further configured to send the bearer instruction message to the access network when the processor detects that the user equipment is a smart phone.

22. The apparatus according to claim 19, wherein the bearer instruction message further comprises a reference maintaining duration where the access network maintains the bearer, so that the access network determines, according to the reference maintaining duration, a specific maintaining duration where the access network maintains the bearer corresponding to the user equipment.

23. The apparatus according to claim 19, further comprising:
a processor configured to maintain a radio access bearer (RAB) corresponding to the user equipment.

24. The apparatus according to claim 19, further comprising:
a processor configured to maintain an Iu connection corresponding to the user equipment.

25. The apparatus according to claim 24, wherein the processor is further configured to release a radio access bearer (RAB) corresponding to the user equipment.

26. The apparatus according to claim 19, further comprising:
a processor configured to detect a service type of the user equipment,
wherein the transmitter is further configured to send a bearer instruction message to the access network when the processor detects that the user equipment implements a frequent packet service.

27. The apparatus according to claim 19, further comprising:
a processor configured to detect a signaling load state of a core network,
wherein the transmitter is further configured to send a bearer instruction message to the access network when the processor detects that a signaling overload has occurred on the core network.

28. A service processing apparatus comprising:
a receiver configured to receive a packet data protocol (PDP) deactivation request message sent from a user equipment and to receive a bearer instruction message sent from an access network, wherein the bearer instruction message comprises instruction information used to instruct a core network to maintain the bearer corresponding to the user equipment; and
a processor configured to maintain the bearer corresponding to the user equipment according to the bearer instruction message.

29. The apparatus according to claim 28, wherein the bearer instruction message further comprises a reference maintaining duration where the core network maintains the bearer, and wherein the processor is further configured to determine, according to the reference maintaining duration, a specific maintaining duration where the core network maintains the bearer corresponding to the user equipment, to maintain the bearer corresponding to the user equipment in the specific maintaining duration, and to release the bearer corresponding to the user equipment when the specific maintaining duration expires.

30. A service processing apparatus comprising:
a receiver configured to receive a signaling connection release indication (SCRI) message sent from a user equipment, and to receive a bearer instruction message sent from a core network, wherein the bearer instruction message comprises instruction information used to instruct an access network to maintain the bearer corresponding to the user equipment; and
a processor configured to maintain the bearer corresponding to the user equipment according to the bearer instruction message.

31. The apparatus according to claim 30, wherein the bearer instruction message further comprises a reference maintaining duration where the access network maintains the bearer, and wherein the processor is further configured to determine, according to the reference maintaining duration, a specific maintaining duration where the access network maintains the bearer corresponding to the user equipment, to maintain the bearer corresponding to the user equipment in the specific maintaining duration, and to release the bearer corresponding to the user equipment when the specific maintaining duration expires.

32. A service processing apparatus comprising:
   a receiver configured to receive a signaling connection release indication (SCRI) message sent from a user equipment; and
   a transmitter configured to send a bearer instruction message to a core network, wherein the bearer instruction message comprises instruction information used to instruct the core network to maintain the bearer corresponding to the user equipment.

33. The apparatus according to claim 32, further comprising:
   a processor configured to detect at least one of a terminal type of the user equipment, a service type of the user equipment, and a signaling load state of the core network, and wherein the transmitter is further configured to send the bearer instruction message to the core network when the processor detects that the user equipment is a smart phone, that the user equipment implements a frequent packet service, or that a signaling overload occurs on the core network.

34. The apparatus according to claim 33, wherein the bearer instruction message further comprises a reference maintaining duration where the core network maintains the bearer, so that the core network determines, according to the reference maintaining duration, a specific maintaining duration where the core network maintains the bearer corresponding to the user equipment.

* * * * *